(12) United States Patent
Anderson (10) Patent No.: US 7,963,547 B2
(45) Date of Patent: Jun. 21, 2011

(54) ARTICULATED VEHICLE STABILIZATION SYSTEM (75) Inventor: Eric Richard Anderson, Galena, IL (US)

(73) Assignee: Deere & Company, Moline, IL (US)

( * ) Notice: Subject to any disclaimer, the term of this patent is extended or adjusted under 35 U.S.C. 154(b) by 251 days.

(21) Appl. No.: 12/258,066

(22) Filed: Oct. 24, 2008

(65) Prior Publication Data

US 2009/0196722 A1   Aug. 6, 2009

Related U.S. Application Data

(60) Provisional application No. 61/025,555, filed on Feb. 2, 2008.

(51) Int. Cl.
*B62D 53/06* (2006.01)
(52) U.S. Cl. ............... 280/683; 280/432; 280/5.501
(58) Field of Classification Search ........... 280/5.501, 280/5.506, 5.507, 5.51, 5.512, 682, 683, 280/676, 677, 104; 180/235
See application file for complete search history.

(56) References Cited

U.S. PATENT DOCUMENTS

| | | | |
|---|---|---|---|
| 3,211,498 A | 10/1965 | Peller | |
| 5,383,680 A | 1/1995 | Bock et al. | |
| 5,538,266 A | 7/1996 | Martin et al. | |
| 5,865,444 A | 2/1999 | Kempfet et al. | |
| 5,882,031 A | 3/1999 | VanDenberg | |
| 5,971,425 A | 10/1999 | Dinsley et al. | |
| 6,116,697 A | 9/2000 | Smith et al. | |
| 6,460,872 B2 | 10/2002 | Cadden | |
| 6,585,286 B2 * | 7/2003 | Adema et al. | 280/677 |
| 6,631,773 B1 | 10/2003 | Walker | |
| 6,641,223 B2 | 11/2003 | Kingston | |
| 6,668,225 B2 | 12/2003 | Oh et al. | |
| 6,679,504 B2 * | 1/2004 | Delorenzis et al. | 280/5.507 |
| 6,715,579 B1 | 4/2004 | Hendron | |
| 7,178,824 B2 | 2/2007 | Ziech | |
| 7,770,909 B2 | 8/2010 | Anderson et al. | |
| 2005/0051373 A1 | 3/2005 | Bernhardt et al. | |
| 2005/0110242 A1 | 5/2005 | Ziech | |
| 2005/0154512 A1 | 7/2005 | Schubert et al. | |
| 2007/0145809 A1 * | 6/2007 | Timoney et al. | 298/22 P |

FOREIGN PATENT DOCUMENTS

JP       6157467       3/1986

OTHER PUBLICATIONS

Bell Equipment, B40D&B35D, Articulated Trucks, 14 pages, date unknown.
Bell Equipment, B50D, 6×6, Articulated Dump Truck, 4 pages, date unknown.
Bell Equipment, B40D, 6×4, Super Truck, 4 pages, date unknown.
John Deere, 350D 400D, 12 pages, date unknown.
John Deere, 250D 300D, 12 pages, date unknown.
Harold Josephs and Ronald L.Hutson, Dynamics of Mechanical Systems: Chapter 6, CRG Press LLC, Copyright 2002, 45 pages.
Chris H. Luebkeman and Donald Peting, Lecture 4: What is a Force? Copyright 1995,1996, available at http://darkwing.uoregon.edu/-struct/courseware/461/461_lectures/461_lecture4/461 Jecture4. html (last visited Aug. 6, 2008), 3 pages.
English translation of JP 61-57467, 11 pages.

* cited by examiner

*Primary Examiner* — Paul N Dickson
*Assistant Examiner* — Timothy D Wilhelm
(74) *Attorney, Agent, or Firm* — Baker & Daniels LLP (57) ABSTRACT

An articulated vehicle is provided including a stabilization system configured to resist roll-over of a trailer portion of the vehicle.

19 Claims, 6 Drawing Sheets

ARTICULATED VEHICLE STABILIZATION SYSTEM

CROSS-REFERENCE TO RELATED APPLICATIONS

The present application is a continuation-in-part of U.S. patent application Ser. No. 11/186,563, filed Jul. 21, 2005, titled "Articulated Vehicle Stabilization System," to Anderson et al., and the present application claims the benefit of U.S. Provisional Application Ser. No. 61/025,555, filed Feb. 2, 2008, titled "Articulated Vehicle Stabilization System," to Anderson, the disclosures of which are expressly incorporated by reference herein.

FIELD OF THE INVENTION

The present invention relates to articulated vehicles and, more particularly, to a stabilization system for resisting the roll-over of an articulated vehicle.

BACKGROUND AND SUMMARY OF THE INVENTION

Articulated vehicles, such as articulated dump trucks (ADT's) are well-known in the art. For example, ADT's typically include a cab portion having a first frame supporting an operator cab, and a trailer portion having a second frame supporting a bin. The bin is configured to contain a load and is typically coupled to an actuator for angular movement relative to the second frame. The first frame and the second frame may be operably coupled through a universal joint including a pivot frame coupling for providing articulated movement of the first frame relative to the second frame about a vertical axis, and an oscillation frame coupling for providing oscillatory movement of the second frame relative to the first frame about a longitudinal axis. A first wheel assembly supports the first frame, and a second wheel assembly supports the second frame. The second wheel assembly includes a rotatably supported front wheel and a rotatably supported rear wheel. The front wheel and the rear wheel are coupled to a tandem or walking beam which, in turn, is pivotally coupled to the second frame by a tandem coupling. As such, the front wheel and the rear wheel are supported for pivoting movement about the tandem coupling to facilitate continuous wheel engagement over rough terrain.

ADT's may suffer from stability issues when not operated or loaded correctly. For example, instability may arise from the ADT being poorly loaded (too much weight too far forward on the bin), being near the end of the articulation range, and may be aggravated by operating in such a condition at relatively high speeds. Such stability issues may result in a "bin dump" condition where the center of gravity of the trailer portion moves outwardly over a line of action extending from the pivot frame coupling to the tandem coupling. In this condition, the trailer portion rolls over while the cab portion remains upright. While such a roll-over typically does not cause permanent equipment damage or operator injury, it causes the ADT and a related excavator to be out of commission until the trailer portion is uprighted.

According to one aspect of the present disclosure, a vehicle is provided including: a first frame; a first wheel assembly operably coupled to the first frame; a second frame defining a longitudinal axis; and a second wheel assembly operably coupled to the second frame. The second wheel assembly includes a tandem pivotally coupled to the second frame at a pivot coupling, a front wheel operably coupled to the tandem, and a rear wheel operably coupled to the tandem. The vehicle further includes a bin supported by the second frame and configured to support a load; and a frame coupling between the first frame and the second frame. The coupling is configured to provide pivoting movement between the first frame and the second frame about a vertical axis. The vehicle further includes a vehicle condition sensor configured to detect a condition of the vehicle; a controller in communication with the vehicle condition sensor; and a stabilizer operably coupled to the second frame and the tandem. The stabilizer includes a cylinder configured to restrict pivoting movement of the tandem in response to the condition sensed by the vehicle condition sensor. The stabilizer further including a valve controlling the supply of pressurized fluid to the cylinder.

According to another aspect of the present disclosure, a transport vehicle is provided that is configured to transport a load. The vehicle includes: a front vehicle frame assembly operably coupled to the front vehicle frame to provide rolling support for the front vehicle frame; and a trailer. The trailer includes a trailer frame and a trailer wheel assembly operably coupled to the trailer frame to provide rolling support for the trailer frame. The trailer wheel assembly includes a trailer tandem pivotally coupled to the trailer at a tandem pivot coupling, a front trailer tandem wheel rotatably coupled to the trailer tandem of the trailer wheel assembly to provide rolling support of the trailer tandem of the trailer wheel assembly, and a rear trailer tandem wheel rotatably coupled to the trailer tandem of the trailer wheel assembly to provide rolling support of the trailer tandem of the trailer wheel assembly. The trailer further includes a load bin supported by the trailer frame and configured to support a load transported by the transport vehicle; a center of gravity; and at least two lines of action defining a stability region therebetween. The vehicle further includes a transport vehicle frame coupling positioned between the front vehicle frame and the trailer frame and configured to provide pivoting movement between the front vehicle frame and the trailer frame about a vertical pivot axis. The vehicle further includes a transport vehicle condition sensor configured to detect a condition of the transport vehicle; a transport vehicle controller in communication with the transport vehicle condition sensor; and a transport vehicle stabilizer operably coupled to the trailer frame and the trailer tandem. The transport vehicle stabilizer includes a fluid cylinder configured to restrict pivoting movement of the transport vehicle tandem of the second transport vehicle wheel assembly in response to the condition of the transport vehicle sensed by the transport vehicle condition sensor, a fluid pump, the fluid pump being configured to supply fluid under pressure, and at least one fluid valve including a valve housing and a valve member positioned within the valve housing to control the flow of fluid. The stabilizer further includes at least one fluid line, the at least one fluid line communicating fluid between the fluid cylinder, the fluid pump, and the at least one fluid valve. The at least one fluid valve is configured to control the position of at least one of the lines of action to control the size of the area of the stability region.

According to another aspect of the present disclosure, a transport vehicle is provided that is configured to transport a load. The vehicle includes a first transport vehicle frame; a first transport vehicle wheel assembly operably coupled to the first transport vehicle frame to provide rolling support for the first transport vehicle frame; a second transport vehicle frame defining a longitudinal transport vehicle frame axis; and a second transport vehicle wheel assembly operably coupled to the second transport vehicle frame to provide rolling support for the second transport vehicle frame. The second transport vehicle wheel assembly includes a transport vehicle tandem pivotally coupled to the second transport vehicle frame at a tandem pivot coupling, a front tandem wheel rotatably coupled to the transport vehicle tandem of the second transport vehicle wheel assembly to provide rolling support of the transport vehicle tandem of the second transport vehicle wheel assembly, and a rear tandem wheel rotatably coupled to the transport vehicle tandem of the second transport vehicle wheel assembly to provide rolling support of the transport vehicle tandem of the second transport vehicle wheel assembly. The vehicle further includes a load bin supported by the second transport vehicle frame and configured to support a load transported by the transport vehicle; a transport vehicle frame coupling between the first transport vehicle frame and the second transport vehicle frame and configured to provide pivoting movement between the first transport vehicle frame and the second transport vehicle frame about a vertical pivot axis; a transport vehicle condition sensor configured to detect a condition of the transport vehicle; a transport vehicle controller in communication with the transport vehicle condition sensor; and a transport vehicle stabilizer operably coupled to the second transport vehicle frame and the transport vehicle tandem of the second transport vehicle wheel assembly. The transport vehicle stabilizer includes a fluid cylinder configured to restrict pivoting movement of the transport vehicle tandem of the second transport vehicle wheel assembly in response to the condition of the transport vehicle sensed by the transport vehicle condition sensor, a fluid pump configured to supply fluid under pressure, a fluid reservoir configured to hold the fluid, at least one fluid valve being configured to control the flow of fluid, and at least one fluid line. The at least one fluid line communicates fluid between the fluid cylinder, the fluid pump, the fluid reservoir, and the at least one fluid valve. The at least one fluid valve is configured to control the flow of fluid between the fluid pump and the fluid cylinder and the supply of fluid between the fluid reservoir and the fluid cylinder. The at least one fluid valve is configured to receive an input from the controller based on the transport vehicle condition of the transport vehicle sensed by the transport vehicle condition sensor to control the proportion of the fluid flowing through the at least one fluid line between the fluid pump and the fluid cylinder and the proportion of fluid flowing through the at least one fluid line between the fluid reservoir and the fluid cylinder.

Additional features and advantages of the present invention will become apparent to those skilled in the art upon consideration of the following detailed description of the illustrative embodiment exemplifying the best mode of carrying out the invention as presently perceived.

BRIEF DESCRIPTION OF THE DRAWINGS

The detailed description of the drawings particularly refers to the accompanying figures in which.

DETAILED DESCRIPTION OF THE DRAWINGS

Figure 1:
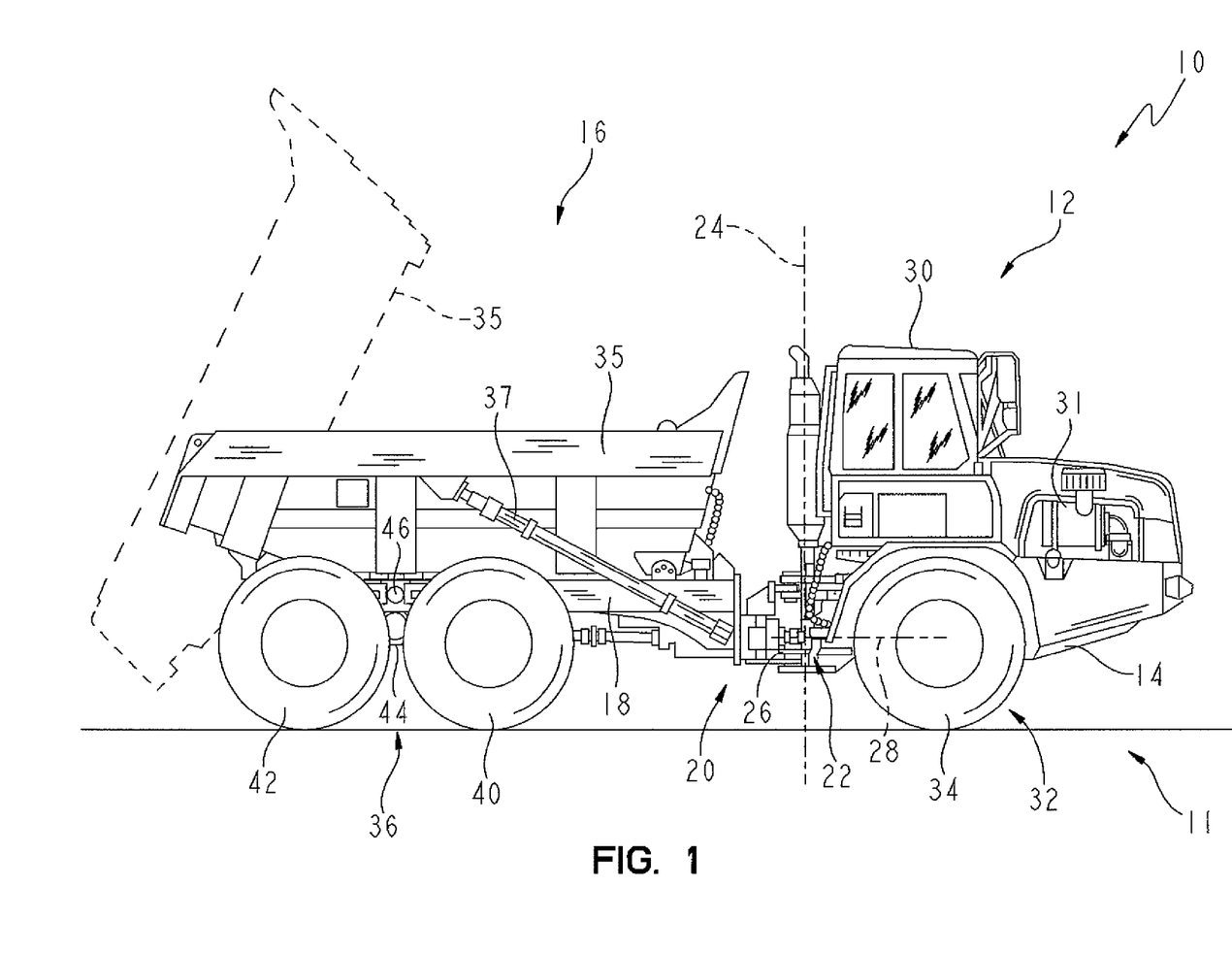
FIG. 1 is a side elevational view of an illustrative embodiment articulated vehicle incorporating the stabilization system of the present disclosure.
Figure 2:
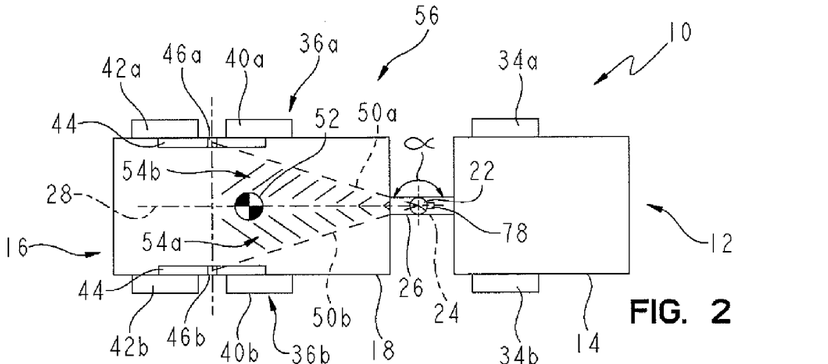
FIG. 2 is a top schematic view of the articulated vehicle of FIG. 1, showing the first frame and the second frame in an aligned position.

Referring initially to FIGS. 1 and 2, the articulated vehicle 10 of the illustrative embodiment illustratively includes a chassis 11 having a first or cab portion 12 and a second or trailer portion 16. The cab portion 12 includes a first frame 14, and the trailer portion 16 includes a second frame 18. The first frame 14 is connected to the second frame 18 through a coupling assembly 20. The coupling assembly 20 includes pivot frame coupling 22 which provides for articulated movement, or turning, of the second frame 18 relative to the first frame 14 about a vertical axis 24. The coupling assembly 20 further includes an oscillatory frame coupling 26 which provides for pivoting movement, or oscillation, of the second frame 18 relative to the first frame 14 about a longitudinal axis 28.

The first frame 14 illustratively supports an operator's cab 30 and an engine 31 for propelling the vehicle 10. A first or front wheel assembly 32 supports the cab portion 12 and is operably coupled to the first frame 14. The first wheel assembly 32 includes a pair of wheels 34a and 34b.

A bin 35 for containing a load is supported by the second frame 18. An actuator, such as a hydraulic cylinder 37, may be coupled to the bin 35 for angularly elevating the bin 35 relative to the second frame 18 (as shown in phantom in FIG. 1). Left and right second or rear wheel assemblies 36a, 36b are supported by the second frame 18 and each illustratively includes a front wheel 40 and a rear wheel 42. Each of the front wheels 40 and the rear wheels 42 are rotatably coupled to a tandem or walking beam 44. The tandem 44 is pivotally coupled to the second frame 18 through a pivot tandem coupling 46. Operation of the tandem 44 facilitates pivoting movement of the front wheel 40 relative to the rear wheel 42 about the coupling 46, thereby facilitating continuous ground engagement by the wheels 40 and 42. As shown in FIGS. 1-4 and 7, the coupling 46 consists of a rigid shaft that extends from second frame 18 to the tandem 44 to provide the pivoting therebetween. Other than rotation, the shaft 46 has a fixed position relative to second frame 18 so that the shaft 46 always moves vertically, longitudinally, and laterally with second frame 18. As a result, as the bin 35 is loaded and unloaded and when the vehicle rides over bumpy or uneven terrain, the shaft 46 moves with the second frame 18. The front and rear wheels 40 and 42 are at a fixed distance from the shaft 46. As a result, the vertical location of the axis of rotation of the front and rear wheels 40 and 42 relative to the second frame 18 is independent of the load carried by the bin 35. Because the shaft 46, which is rigid, is directly coupled to the second frame 18 and the tandem 44, there spring constant between the second frame 18 and the tandem 44 is extremely large so that there is no body roll between the second frame 18 and the tandem 44.

As shown in FIG. 2, during a normal or unrestricted mode or operation, a line of action 50a, 50b extends between the pivot frame coupling 22 and each tandem coupling 46a, 46b. The trailer portion 16, including the second frame 18, the bin 35 and any load supported therein, define a center of gravity 52. It is well known that if the center of gravity 52 moves out of the stability regions 54a, 54b defined between the longitudinal axis 28 and the lines of action 50a, 50b (FIG. 2), then the trailer portion 16 will become unstable and may roll over.

The present disclosure includes a stabilization system 56 which is configured to move the lines of action 50a, 50b outwardly further away from the longitudinal axis 28 and the geometric center of the trailer portion 16.

Figure 3:
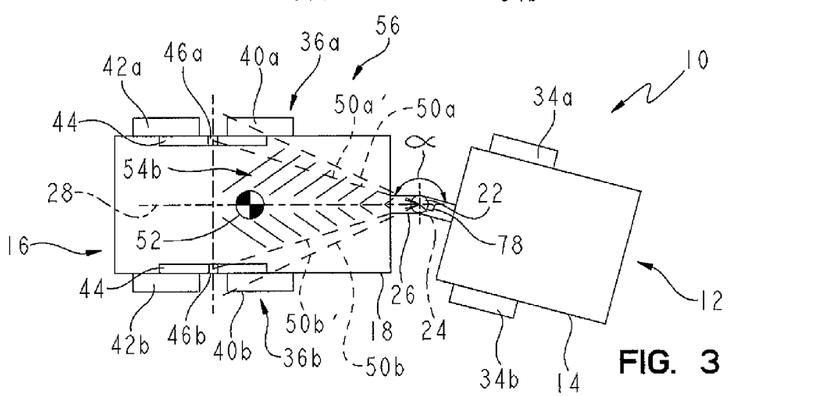
FIG. 3 is a top schematic view similar to FIG. 2, showing the second frame in a first articulated position relative to the first frame.

As shown in FIG. 3, the illustrative stabilization system 56 cooperates with the second wheel assemblies 36a, 36b to move the respective line of action 50a, 50b outwardly away from the longitudinal axis 28 from its position 50a', 50b' in the unrestricted mode of operation. As the angle of articulation α between the first frame 14 and the second frame 18 about the pivot frame coupling 22 increases, the line of action 50a, 50b moves further outward until it intersects a center of the respective front wheel 40 (line of action 50a shown in FIG. 4).

The stabilization system 56 is operably coupled to the second frame 18 and is configured to prevent the center of gravity 52 from traveling outwardly from the longitudinal axis 28 beyond the line of action 50a, 50b. The stabilization system 56 illustratively includes a stabilizer 58 coupled between the second frame 18 and the tandem 44 of each rear wheel assembly 56a, 56b. In the illustrative embodiment of the present disclosure shown in FIG. 7, the stabilizer 58 comprises an actuator, such as a hydraulic cylinder 60 including a cylindrical body 62 receiving a movable piston 64. A rod 66 is coupled to the piston 64 for movement therewith. A free end 68 of the rod 66 is pivotally coupled to a mounting block 70 which in turn, is coupled to the tandem 44. A mounting bracket 72 of the body 62 of the cylinder 60 is pivotally coupled to the second frame 18. While the illustrative embodiment uses a hydraulic cylinder 60, it should be appreciated that other devices may be substituted therefor. More particularly, any device configured to provide resistance to pivoting movement of the tandem 44 may be used, such as pneumatic cylinders, spring mechanisms, and other electromechanical adjusting elements.

Figure 5:
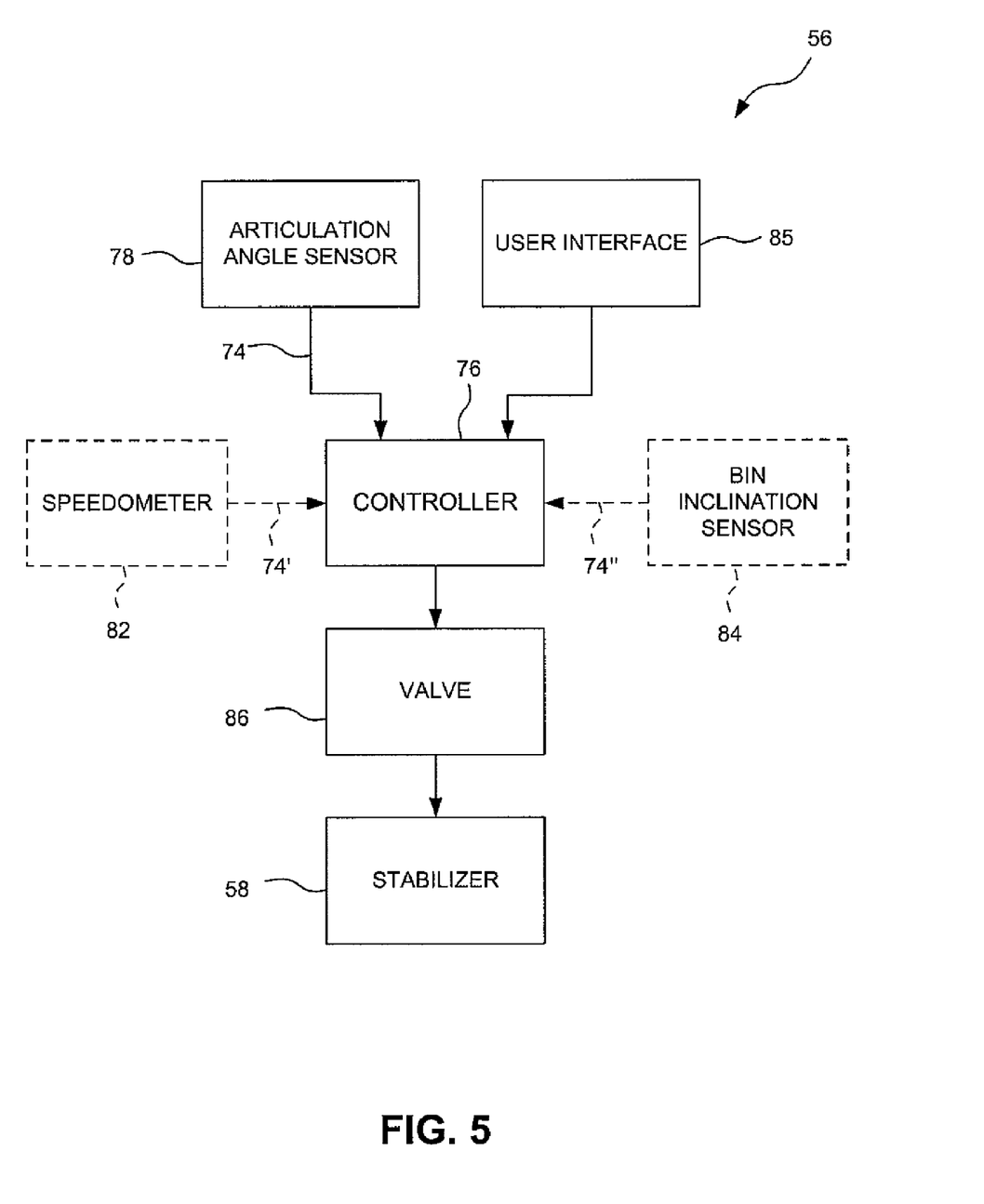
FIG. 5 is a block diagram of the illustrative embodiment control system of the stabilization system of FIG. 1.

The stabilizer 58 is configured to "stiffen", or resist pivoting movement of, the tandem 44 in response to an input 74 from a vehicle condition sensor. More particularly, the stabilizer 58 is configured to increase resistance to pivoting movement of the tandem 44 about the tandem coupling 46 in response to such an input 74. Illustratively, the stabilizer 58 is in communication with a controller 76 which controls the operation of the stabilizer 58. In one illustrative embodiment, the input 74 is from an articulation angle sensor 78 which is operably coupled to the pivot frame coupling 22. As the first frame 14 articulates or pivots relative to the second frame 18 about the pivot frame coupling 22, the angle α is measured by the articulation angle sensor 78 and provided to the controller 76. As the measured angle α increases, the controller causes the stabilizer 58 to limit pivoting movement of the tandem 44. The articulation angle sensor 78 may comprise a conventional potentiometer, or other similar angle sensor. In a further illustrative embodiment, the articulation angle sensor 78 may be integrated within the vehicle steering system (not shown).

Inputs 74', 74" may also be provided by other vehicle condition sensors, alone or in combination with the articulation angle sensor 78. For example, a speedometer 82 may be coupled to the controller 76 and configured to measure the speed of the vehicle 10. In response to the measured speed, the controller 76 controls operation of the stabilizer 58. More particularly, the controller 76 increases dampening, or resistance to movement, of tandem 44 as the measured speed increases. In a further illustrative embodiment, a bin inclination sensor 84 may be coupled to the controller and configured to measure the angle of inclination of the bin 35 relative to the second frame 18. In response to the measured angle of inclination, the controller controls operation of the stabilizer 58. More particularly, the controller 76 increases dampening, or resistance to movement, of tandem 44 as the measured angle increases. A user interface 85 may also be provided for the operator to access the controller 76, for example, to modify settings or input instructions. The user interface 85 may be of conventional design, such as a keypad or control panel, and is illustratively positioned within the cab 30.

Figure 6:
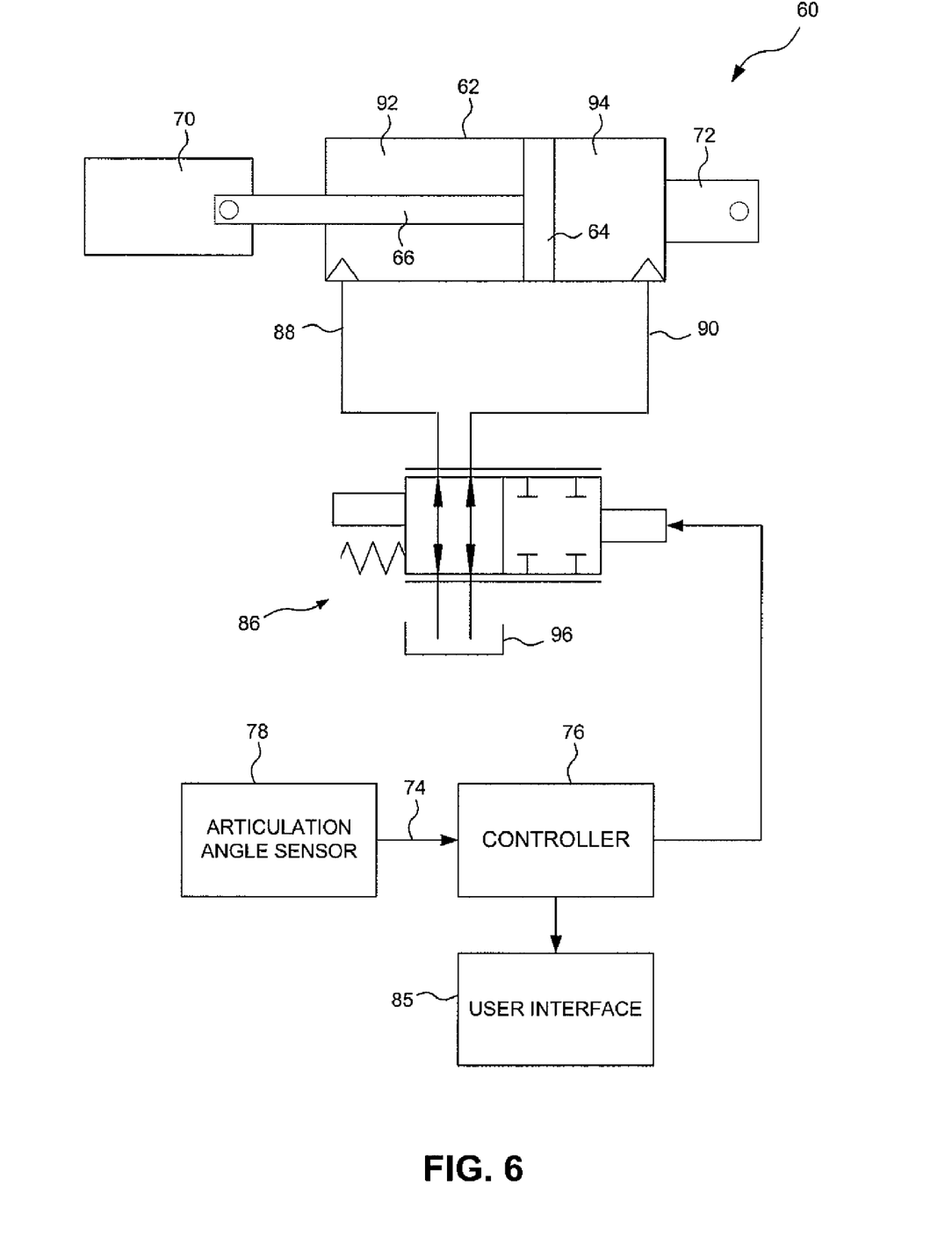
FIG. 6 is a schematic diagram of the illustrative embodiment stabilization system.
Figure 7:
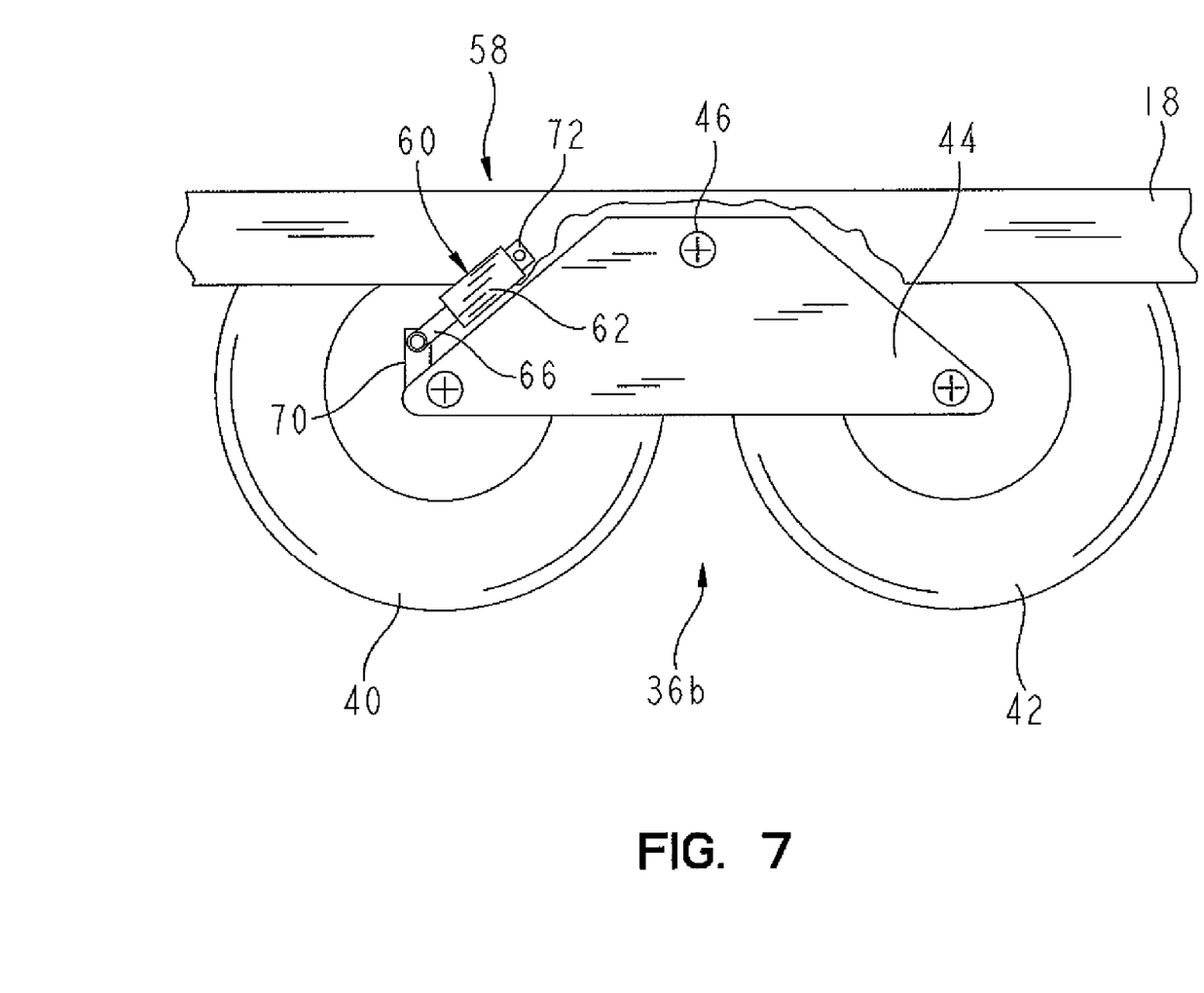
FIG. 7 is a side view, in partial schematic, of an illustrative embodiment rear wheel assembly of the vehicle of FIG. 1.

Referring now to FIG. 6, one illustrative embodiment of the stabilization system 56 includes a two-position, four-way control valve 86 which is operated by the controller 76. Lines 88 and 90, which are in fluid communication with respective chambers 92 and 94 of the hydraulic cylinder 60, are selectively connectable, via the proportional valve 86, to a tank or fluid reservoir 96. The valve 86 is configured to be moved by the controller 76 for incrementally isolating the hydraulic cylinder 60 from the reservoir 96.

In the normal or unrestricted mode of operation, fluid is permitted to flow between the reservoir 96 and the hydraulic cylinder 60. As the input 74 provided by the sensor 78 to the controller 76 indicates an increase in the articulation angle α, the valve 86 begins to close and increases resistance to the additional pivoting movement of the tandem 44. In this partially closed situation, the cylinder 60 acts as a damper. When the measured articulation angle α reaches a predetermined value, the valve 86 closes, thereby isolating the hydraulic cylinder 60. As such, the hydraulic cylinder 60 opposes farther pivoting movement of the tandem 44.

As the cylinder 60 causes resistance to movement of the tandem to increase, the line of action 50 moves in a direction away from the tandem pivot coupling 46 toward the center of the front wheel 40. In other words, the stability region 54 increases as the line of action 50 moves outwardly away from the geometric center and longitudinal axis 28 of the second frame 18. When the cylinder 60 is completely isolated, the line of action 50 extends from the pivot frame coupling 22 to the center of the front wheel 40. As may be appreciated, by moving the line of action 50 toward the front wheel 40, stability of the trailer portion 16 is increased since the line of action 50 is positioned further from the center of gravity 52.

In a farther illustrative embodiment of the stabilization system 56, an electro-hydraulic pressure reducing valve may be used to modify the load distribution from the rear wheel 42 to the front wheel 40, resulting in a better supported load while the second frame 18 is articulated relative to the first frame 14.

In yet another illustrative aspect of the stabilization system 56, the oscillatory frame coupling 26 may be controlled, illustratively by dampening, to facilitate the transmission of torque therethrough from the second frame 18 to the first frame 14 in response to articulation about the pivot frame coupling 22. In other words, the coupling 26 permits the transmission of torque to resist roll-over of the trailer portion 16, while also preventing the roll-over of the cab portion 12. The torque may be transferred through the use of a clutch (not shown) on the oscillatory shaft (not shown) that provides for oscillation between the second frame 18 and the first frame 14. The amount of torque transmitted can be varied as a function of the articulation between the first and second frames 14, 18 or any other vehicle condition such as the speed of ADT 10. Illustratively, the amount of torque transferred is limited to avoid tipping the cab portion 12 with the trailer portion 16 in the event of a bin dump.

Figure 4:
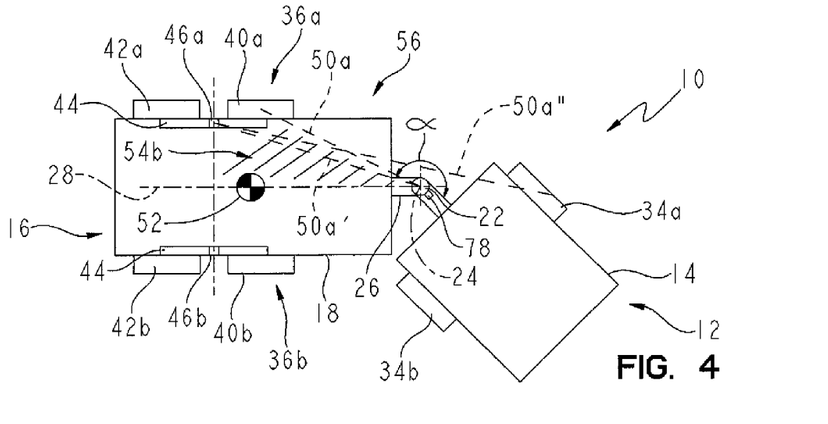
FIG. 4 is a top schematic view similar to FIG. 2, showing the second frame in a second articulated position relative to the first frame.

As shown in FIG. 4, by increasing the transmission of torque through the coupling 26, the line of action 50a" is moved outwardly away from the longitudinal axis 28. More particularly, the line of action 50a" is moved outwardly from a position intersecting the pivot axis 22. In the illustrative embodiment as shown in FIG. 4, upon full implementation of the stabilization system 56, the line of action 50a" intersects the wheel 34a of the cab portion 12. It should be appreciated that by combining the dampening of the tandem 44 and the dampening of the oscillatory frame coupling 26, the line of action 50a could be moved to intersect points proximate both the wheel 40a and the wheel 34a, respectively.

Figure 8:
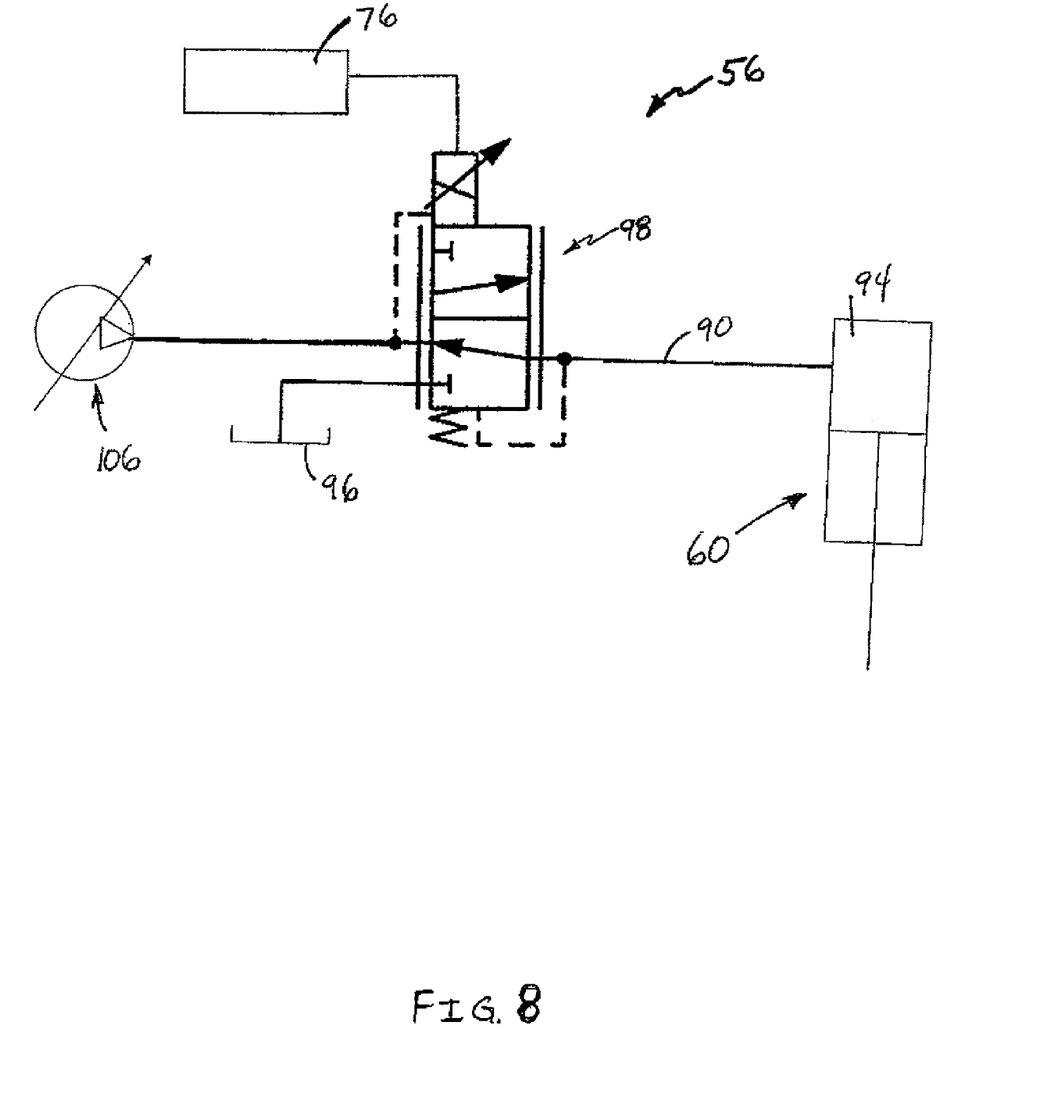
FIG. 8 is a schematic view of a preferred valve arrangement.

Referring now to FIG. 8, one illustrative embodiment of the stabilization system 56 includes a proportional, pressure reducing valve 98, which is operated by controller 76. Line 90, which is in fluid communication with chamber 94 of the hydraulic cylinder 60, is selectively connectable, via the proportional valve 98 between a pump 106 and fluid reservoir 96. The valve 98 is configured to be moved by controller 76 to incrementally increase or decrease the fluid pressure to chamber 94 of the hydraulic cylinder 60.

In the normal or unrestricted mode of operation, valve 98 permits fluid to flow between reservoir 96 and hydraulic cylinder 60 so that hydraulic cylinder 60 provides little or no resistance to pivoting of tandem 44. As input 74 provided by sensor 78 to controller 76 indicates an increase in the articulation angle α (or other instability input or combination of instability inputs), valve 98 begin to shift and apply pressure from pump 106 to chamber 94 to apply force to front tire 40. When the measured articulation angle α (or other instability input or combination of instability inputs) reaches a predetermined value, valve 98 opens completely to pump 106 to apply a predetermined maximum force to front tire 40.

As cylinder 60 causes force to be applied to front tire 40, front tire 40 supports an increasing percentage of the load and line of action 50 moves in a direction away from tandem pivot coupling 46 toward the center of front wheel 40. In other words, the stability region 54 increases as line of action 50 moves outwardly away from the geometric center and longitudinal axis 28 of second frame 18. When valve 98 is fully open and full force is applied by cylinder 60, line of action 50 extends from pivot frame coupling 22 to the center of front wheel 40. As may be appreciated, by moving line of action 50 toward front wheel 40, stability of trailer portion 16 is increased since line of action 50 is positioned further from center of gravity 52. As the instability input(s) deceases, controller 76 reduces the force applied by cylinder 60 to permit tandem 44 to more freely pivot about coupling 46.

Although the invention has been described in detail with reference to certain preferred embodiments, variations and modifications exist within the spirit and scope of the invention as described and defined in the following claims.

The invention claimed is:

1. A transport vehicle configured to transport a load including:
    a front vehicle frame;
    a front vehicle wheel assembly operably coupled to the front vehicle frame, the front vehicle wheel assembly providing rolling support for the front vehicle frame;
    a trailer including
        a trailer frame;
        a trailer wheel assembly operably coupled to the trailer frame, the trailer wheel assembly providing rolling support for the trailer frame, the trailer wheel assembly including
            a trailer tandem pivotally coupled to the trailer at a tandem pivot coupling,
            a front trailer tandem wheel rotatably coupled to the trailer tandem of the trailer wheel assembly to provide rolling support of the trailer tandem of the trailer wheel assembly, and
            a rear trailer tandem wheel rotatably coupled to the trailer tandem of the trailer wheel assembly to provide rolling support of the trailer tandem of the trailer wheel assembly;
        a load bin supported by the trailer frame, the load bin being configured to support a load transported by the transport vehicle;
        a center of gravity; and
        at least two lines of action defining a stability region therebetween;
    a transport vehicle frame coupling between the front vehicle frame and the trailer frame, the transport vehicle frame coupling being configured to provide pivoting movement between the front vehicle frame and the trailer frame about a vertical pivot axis;
    a transport vehicle condition sensor, the transport vehicle condition sensor being configured to detect a condition of the transport vehicle;
    a transport vehicle controller, the transport vehicle controller being in communication with the transport vehicle condition sensor; and
    a transport vehicle stabilizer operably coupled to the trailer frame and the trailer tandem, the transport vehicle stabilizer including
        a fluid cylinder configured to restrict pivoting movement of the transport vehicle tandem of the second transport vehicle wheel assembly in response to the condition of the transport vehicle sensed by the transport vehicle condition sensor,
        a fluid pump, the fluid pump being configured to supply fluid under pressure,
        at least one fluid valve including
            a valve housing and
            a valve member positioned within the valve housing to control the flow of fluid, and
        at least one fluid line, the at least one fluid line communicating fluid between the fluid cylinder, the fluid pump, and the at least one fluid valve, the at least one fluid valve being configured to control the position of at least one of the lines of action to control the size of the area of the stability region.

2. The transport vehicle of claim 1, wherein at least one of the lines of action extends through the tandem pivot coupling when the valve is in a first position and the at least one line of action is positioned outward from the tandem pivot coupling when the valve is in a second position.

3. The transport vehicle of claim 1 wherein the transport vehicle stabilizer further includes a reservoir and the at least one fluid line communicates fluid between the at least one fluid valve and the reservoir, the controller provides instructions to the at least one valve to control the proportion of fluid communication between the fluid pump and the fluid cylinder and the proportion of fluid communication between the fluid reservoir and the fluid cylinder, increasing the proportion of fluid communication between the fluid pump and the fluid cylinder increases the area of the stability region.

4. The transport vehicle of claim 1, wherein the tandem pivot coupling includes a shaft defining a shaft pivot axis, the front trailer wheel rotates about a front wheel pivot axis, and a distance between the shaft pivot axis and the front wheel pivot axis is fixed.

5. The transport vehicle of claim 4, wherein the shaft extends from the trailer frame to the trailer tandem, the shaft pivot axis extends horizontal and laterally, and trailer tandem rotates about the shaft pivot axis.

6. The transport vehicle of claim 1, wherein the vertical distance between the center of gravity and the trailer tandem are independent of the condition of the transport vehicle sensed by the transport vehicle condition sensor.

7. A transport vehicle configured to transport a load including:
a first transport vehicle frame;
a first transport vehicle wheel assembly operably coupled to the first transport vehicle frame, the first transport vehicle wheel assembly providing rolling support for the first transport vehicle frame;
a second transport vehicle frame defining a longitudinal transport vehicle frame axis;
a second transport vehicle wheel assembly operably coupled to the second transport vehicle frame, the second transport vehicle wheel assembly providing rolling support for the second transport vehicle frame, the second transport vehicle wheel assembly including
a transport vehicle tandem pivotally coupled to the second transport vehicle frame at a tandem pivot coupling,
a front tandem wheel rotatably coupled to the transport vehicle tandem of the second transport vehicle wheel assembly to provide rolling support of the transport vehicle tandem of the second transport vehicle wheel assembly, and
a rear tandem wheel rotatably coupled to the transport vehicle tandem of the second transport vehicle wheel assembly to provide rolling support of the transport vehicle tandem of the second transport vehicle wheel assembly;
a load bin supported by the second transport vehicle frame, the load bin being configured to support a load transported by the transport vehicle;
a transport vehicle frame coupling between the first transport vehicle frame and the second transport vehicle frame, the transport vehicle frame coupling being configured to provide pivoting movement between the first transport vehicle frame and the second transport vehicle frame about a vertical pivot axis;
a transport vehicle condition sensor, the transport vehicle condition sensor being configured to detect a condition of the transport vehicle;
a transport vehicle controller, the transport vehicle controller being in communication with the transport vehicle condition sensor;
a transport vehicle stabilizer operably coupled to the second transport vehicle frame and the transport vehicle tandem of the second transport vehicle wheel assembly, the transport vehicle stabilizer including
a fluid cylinder configured to restrict pivoting movement of the transport vehicle tandem of the second transport vehicle wheel assembly in response to the condition of the transport vehicle sensed by the transport vehicle condition sensor,
a fluid pump, the fluid pump being configured to supply fluid under pressure,
a fluid reservoir configured to hold the fluid,
at least one fluid valve being configured to control the flow of fluid, and
at least one fluid line, the at least one fluid line communicating fluid between the fluid cylinder, the fluid pump, the fluid reservoir, and the at least one fluid valve, the at least one fluid valve being configured to control the flow of fluid between the fluid pump and the fluid cylinder and the supply of fluid between the fluid reservoir and the fluid cylinder, the at least one fluid valve being configured to receive an input from the controller based on the transport vehicle condition of the transport vehicle sensed by the transport vehicle condition sensor to control the proportion of the fluid flowing through the at least one fluid line between the fluid pump and the fluid cylinder and the proportion of fluid flowing through the at least one fluid line between the fluid reservoir and the fluid cylinder; and
a line of action, wherein the line of action moves relative to the second frame in response to movement of the valve.

8. The transport vehicle of claim 7, wherein the controller increases the proportion of fluid communication between the pump and the cylinder and decreases the proportion of fluid communication between the pump and the cylinder as the vehicle condition sensor detects decreased stability of the vehicle.

9. The transport vehicle of claim 7, wherein the tandem pivot coupling includes a shaft defining a shaft pivot axis, the front tandem wheel rotates about a front tandem wheel pivot axis, and a distance between the shaft pivot axis and the front tandem wheel pivot axis is fixed.

10. The transport vehicle of claim 9, wherein the shaft extends from the second transport vehicle frame to the transport vehicle tandem, the shaft pivot axis extends horizontal and laterally, and the transport vehicle tandem rotates about the shaft pivot axis.

11. The transport vehicle of claim 7, wherein the vertical distance between the second transport vehicle frame and the transport vehicle tandem is independent of the load carried by the load bin.

12. The transport vehicle of claim 7, wherein the vertical distance between the second transport vehicle frame and the transport vehicle tandem is independent of the condition detected by the vehicle condition sensor.

13. A vehicle including:
a first frame;
a first wheel assembly operably coupled to the first frame;
a second frame defining a longitudinal axis;
a second wheel assembly operably coupled to the second frame, the second wheel assembly including a tandem pivotally coupled to the second frame at a pivot coupling, a front wheel operably coupled to the tandem, and a rear wheel operably coupled to the tandem;
a bin supported by the second frame and configured to support a load;
a frame coupling between the first frame and the second frame, the coupling configured to provide pivoting movement between the first frame and the second frame about a vertical axis;
a vehicle condition sensor configured to detect a condition of the vehicle;
a controller in communication with the vehicle condition sensor;
a stabilizer operably coupled to the second frame and the tandem, the stabilizer including a cylinder configured to restrict pivoting movement of the tandem in response to the condition sensed by the vehicle condition sensor, the stabilizer further including a valve controlling the supply of pressurized fluid to the cylinder; and
a line of action, wherein the line of action moves relative to the second frame in response to movement of the valve.

14. The vehicle of claim 13, wherein the stabilizer further includes a fluid reservoir in fluid communication with the valve and a pump providing the supply of pressurized fluid and being in fluid communication with the valve, the controller controls the valve to regulate the proportion of fluid communication between the fluid reservoir and the cylinder and the fluid communication between the pump and the cylinder.

15. The vehicle of claim 14, wherein the controller increases the proportion of fluid communication between the pump and the cylinder and decreases the proportion of fluid communication between the pump and the cylinder as the vehicle condition sensor detects decreased stability of the vehicle.

16. The vehicle of claim 13, wherein the pivot coupling includes a shaft defining a shaft pivot axis, the front trailer wheel rotates about a front wheel pivot axis, and a distance between the shaft pivot axis and the front wheel pivot axis is fixed.

17. The vehicle of claim 16, wherein the shaft extends from the trailer frame to the trailer tandem, the shaft pivot axis extends horizontal and laterally, and the tandem rotates about the shaft pivot axis.

18. The vehicle of claim 13, wherein the tandem pivots about a pivot axis extending through the tandem.

19. The vehicle of claim 13, wherein the tandem pivots about a pivot axis, and the front wheel and the rear wheel always move in opposite vertical directions relative to the pivot axis.

* * * * *